US009784458B2

(12) United States Patent
Weston

(10) Patent No.: US 9,784,458 B2
(45) Date of Patent: Oct. 10, 2017

(54) THERMAL GRADIENT FLUID HEADER FOR MULTIPLE HEATING AND COOLING SYSTEMS

(71) Applicant: Weston IP, LLC, Bellingham, WA (US)

(72) Inventor: Jeffrey A. Weston, Bellingham, WA (US)

(73) Assignee: Weston IP, LLC, Bellingham, WA (US)

( * ) Notice: Subject to any disclaimer, the term of this patent is extended or adjusted under 35 U.S.C. 154(b) by 202 days.

(21) Appl. No.: 14/545,881

(22) Filed: Jun. 30, 2015

(65) Prior Publication Data

US 2016/0040893 A1 Feb. 11, 2016

Related U.S. Application Data

(63) Continuation of application No. 12/459,724, filed on Jul. 6, 2009, now Pat. No. 9,068,757.
(Continued)

(51) Int. Cl.
*F28F 27/00* (2006.01)
*F24D 3/02* (2006.01)
(Continued)

(52) U.S. Cl.
CPC ............ *F24D 3/02* (2013.01); *F24D 11/0221* (2013.01); *F24D 19/1006* (2013.01); *F24D 19/1078* (2013.01); *F24F 3/06* (2013.01); *F24F 5/0003* (2013.01); *F24D 2200/11* (2013.01); *F24D 2200/12* (2013.01); *F24D 2200/14* (2013.01);
(Continued)

(58) Field of Classification Search
CPC .. F24F 5/0003; F24F 3/10; F24F 11/06; F24F 3/08; F24F 11/08; F24F 11/0009; F24F 11/0012; F24F 5/0075; F24D 10/006
USPC ....... 165/205, 210, 211; 62/238.6, 188, 118, 62/160, 98
See application file for complete search history.

(56) References Cited

U.S. PATENT DOCUMENTS 4,241,588 A 12/1980 Murphy et al.
5,736,059 A 4/1998 MacKelvie
(Continued)

FOREIGN PATENT DOCUMENTS

DE 295 12 343 U1 11/1995
EP 0 387 633 9/1990

*Primary Examiner* — Ljiljana Ciric
(74) *Attorney, Agent, or Firm* — Todd N. Hathaway

(57) ABSTRACT

Apparatus and method for heating/cooling buildings and other facilities. An elongate pipe filled with water or other fluid medium forms a thermal gradient header having temperature zones that are progressively warmer towards one end and cooler towards the other. Multiple heating/cooling systems are connected to the header so as to draw fluid from zones that are closest in temperature to the optimal intake temperature of each system, and to discharge fluid back to the header at zones that are closest to the temperature to the optimal output temperature of each system, allowing each heating/cooling system to take advantage of the thermal output of other systems. The pipe forming the thermal gradient header may be routed back and forth in the facility to define a series of legs containing the different temperature zones. A boiler or other source may supply makeup heat to the thermal gradient header, and excess heat may be sent from the header to a ground field or other thermal reservoir for later use.

29 Claims, 16 Drawing Sheets

Related U.S. Application Data

(60) Provisional application No. 61/133,848, filed on Jul. 3, 2008.

(51) Int. Cl.
*F24D 11/02* (2006.01)
*F24D 19/10* (2006.01)
*F24F 3/06* (2006.01)
*F24F 5/00* (2006.01)
*F24F 11/00* (2006.01)

(52) U.S. Cl.
CPC .. *F24D 2200/24* (2013.01); *F24F 2005/0025* (2013.01); *F24F 2011/0006* (2013.01); *Y02B 10/20* (2013.01); *Y02B 10/40* (2013.01); *Y02B 10/70* (2013.01); *Y02B 30/126* (2013.01); *Y02B 30/52* (2013.01)

(56) References Cited

U.S. PATENT DOCUMENTS

| | | |
|---|---|---|
| 5,782,104 A | 7/1998 | Sami et al. |
| 7,340,906 B2 | 3/2008 | Moffit |
| 2003/0171851 A1 | 9/2003 | Brickfield et al. |

SYSTEM DESCRIPTION: WHEN BUILDING HEADER REQUIRES HEAT BEYOND WHAT THE BUILDING CAN PROVIDE ITSELF USE CHW AND MAKE HW

THERMAL GRADIENT FLUID HEADER FOR MULTIPLE HEATING AND COOLING SYSTEMS

RELATED APPLICATIONS

This application is a continuation of U.S. application Ser. No. 12/459,724 which was filed Jul. 6, 2009 and claims the benefit of U.S. Provisional Patent Application Ser. No. 61/133,848 filed on Jul. 3, 2008.

BACKGROUND a. Field of the Invention

The present invention relates generally to heating and cooling systems for buildings and other facilities, and, more particularly, to an apparatus and method in which the efficiency of heating and cooling systems for a building or other facility is maximized by drawing and discharging water, or another fluid medium, from an elongate header having a hot-to-cold thermal gradient existing along its length, with the intake and discharge points being located along the gradient to optimize the intake and discharge temperatures of each of the heating/cooling systems.

b. Related Art

Maximizing the efficiency of heating and cooling systems has been a goal since time immemorial, but has recently been given greater impetus by rapidly escalating energy costs.

Most modern heating and cooling systems utilize some form of fluid medium for thermal transfer, typically water. For example, a heat pump (water-to-water or water-to-air) or an air handling unit may take in cool water and discharge it at a slightly higher temperature or vice versa, depending on whether it is in a cooling or heating mode. Various other systems intake/discharge water at different temperatures to support their heating/cooling operations; the intake/output temperature parameters and differentials vary widely depending on the nature of the system and the mode and condition in which it is operating at a particular time, with some systems having either or both of the water input and output at relatively mild temperatures and others operating more towards the extremes of hot/cold.

Such systems are commonly optimized for efficiency on an individualized basis, for example, by heating/cooling the incoming water (or other medium) to reduce thermal load of the operation, and/or similarly by cooling or heating the discharge flow to reduce thermal losses. Nevertheless, a degree of inefficiency is inevitable, in significant part due to the differences between optimal intake temperatures for the systems and the actual temperatures of the sources from which the water is drawn. Ultimately, in most facilities some greater or lesser amount of excess thermal energy is created, which is then discharged to the outside air (e.g., free cooling) or otherwise rejected into the environment and thereby lost/wasted. Given the large number and variety of systems that are commonly found in modern buildings, especially in large facilities or complexes, the total loss due to the cumulative inefficiency of the multiple systems can be very great, even though each system is relatively efficient by itself.

Accordingly, there exists a need for an apparatus and method for increasing efficiency and reducing thermal energy loss for multiple heating and cooling systems that operate on combination in buildings, complexes and other facilities. Furthermore, there exists a need for such an apparatus and method that can be utilized with the many different types of heating and cooling systems that may exist throughout a building, complex or other facility. Still further, there exists a need for such an apparatus and method that can be employed on an economical basis, both in terms of operation and initial capital expenditure, so as to achieve significant cost savings when taken as a whole.

SUMMARY OF THE INVENTION

The present invention addresses the problems cited above, and provides an apparatus and method for increasing efficiency of heating and cooling systems for buildings and other facilities.

Broadly, the apparatus comprises (a) an elongate thermal gradient header having at least one zone containing fluid at a relatively higher temperature and at least one zone containing fluid at a relatively lower temperature; and (b) a plurality of heating/cooling systems that draw the fluid from the thermal gradient header and discharge the fluid back thereto, each of the heating/cooling systems having an intake connected to a first one of the zones of the header that contains the fluid at a temperature closer to an optimal intake temperature of the heating/cooling system, and a discharge connected to a second of the zones that contains the fluid at a temperature that is closer to an optimal discharge temperature of the system. The plurality of heating/cooling systems may comprise multiple heating/cooling systems that operate in combination in a building or other facility, that are connected to the thermal gradient header so that some of the systems are drawing from zones of the header fluid that has been discharged to the zones by other of the heating/cooling systems that are connected to the header.

The thermal gradient header may comprise an elongate pipe containing the fluid. The fluid contained in the thermal gradient header may be water. The temperature zones of the header may be formed by legs of the pipe that are routed through the building or other facility. The heating/cooling systems connected to the thermal gradient header may comprise, for example, heat pumps, air handling units, air conditioning units, refrigeration units, water heaters, ice plants, and so on.

The apparatus may further comprise means connected to the thermal gradient header for providing makeup heat if necessary, and the apparatus further comprise means connected to the thermal gradient header for rejecting excess heat if necessary. The means for providing makeup heat may be, for example, a boiler heat exchanger, and the means for rejecting excess heat may be a fluid cooler. The means for rejecting excess heat may also comprise a thermal reservoir from which heat may be recovered during a subsequent period of operation. The thermal reservoir may comprise a ground source thermal field.

The thermal gradient header may comprise multiple legs, each containing fluid at progressively cooler temperatures from hot to cold. The multiple legs may comprise, progressively, a hot water leg, a warm water leg, a cool water leg and a chilled water leg. The legs of the thermal gradient header may be defined by runs of the pipe between sections of the building or other facility. The runs may be routed back and forth between a mechanical room and distribution areas of the building or other facility.

The apparatus may further comprise a plurality of pumps associated with the systems, that each circulate the fluid from a first leg of the header, through the system, and back to a second leg of the header. The heating/cooling systems may be connected to the header by intake and discharge lines through which the fluid is circulated by the pumps. The apparatus may further comprise one or more crossover lines that interconnect the intake and discharge lines, so that the fluid can be selectively circulated through the heating/cooling systems without being drawn from/discharged to the thermal gradient header.

The apparatus may further comprise one or more control valves that are selectively operable to allow the heating/cooling systems to draw from/discharge to the different legs of the thermal gradient header, depending on operating conditions of the individual heating/cooling systems.

Broadly, the method comprises the steps of (a) providing an elongate thermal gradient header having at least one zone containing fluid at a relatively higher temperature and at least one zone containing fluid at a relatively lower temperature, and (b) supplying the fluid from the thermal gradient header to a plurality of heating/cooling systems, the step of supplying the fluid from the thermal gradient header to the plurality of heating/cooling systems comprising drawing the fluid from the thermal gradient header for each heating/cooling system from a first one of the zones that contains the fluid at a temperature closer to an optimal intake temperature of that system, and then discharging the fluid from the system to a second of the zones of the header that contains the fluid at a temperature that is closer to an optimal discharge temperature of that system. The step of discharging the fluid back to the second zone of the thermal gradient header may comprise discharging the fluid back at a lower temperature or a higher temperature than that at which the fluid is drawn from the first zone of the header.

The step of supplying fluid from the thermal gradient header to a plurality of heating/cooling systems may comprise supplying the fluid to multiple heating/cooling systems that operate in combination in a building or other facility, that are connected to the thermal gradient header so that some of the systems draw from zones of the header fluid that has been discharged to those zones at near optimal intake temperatures by others of the heating/cooling systems.

The step of providing a thermal gradient header may comprise providing an elongate pipe that contains the fluid. The fluid may be water. The step of providing the thermal gradient header may comprise routing the elongate pipe so as to form multiple legs of the header that define the temperature zones thereof, containing fluid at progressively cooler temperatures from hot to cold.

The step of supplying fluid from the thermal gradient header to the plurality of heating/cooling systems may comprise drawing the fluid from the header using pumps that are associated with the heating/cooling systems and that circulate the fluid through the heating/cooling systems and back to the receiving next legs of the header.

The step of supplying the fluid to a plurality of heating/cooling systems may further comprising selectively operating one or more control valves to allow the heating/cooling systems to draw from/discharge to the different legs of the thermal gradient header, depending on operating conditions of the heating/cooling systems.

These and other features and advantages of the present invention will be more fully understood from a reading of the following detailed description with reference to the accompanying drawings.

DETAILED DESCRIPTION

Figure 1:
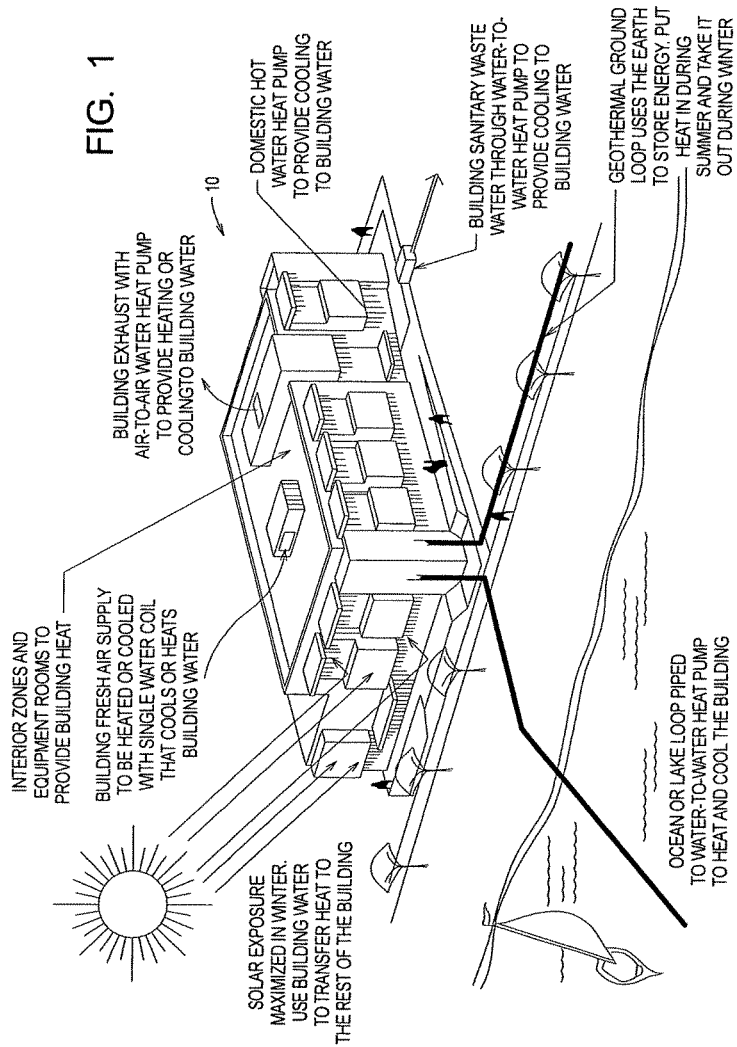
FIG. 1 is a perspective view of an exemplary building having multiple heating/cooling systems, showing the manner in which various loads are placed on these systems.

FIG. 1 shows an exemplary building at 10 having multiple heating and cooling systems installed therein. In this example, the building 10 is a community sports center, a type of facility that typically includes heating/cooling systems that are especially energy intensive and challenging to operate in an efficient manner, including, for example, various heating/cooling systems associated with swimming pools, ice rinks, gym rooms, arenas, and so on. It will be understood, however, that the present invention may be implemented in connection with any facility having heating and cooling systems, whether involving single or multiple buildings.

In accordance with the present invention, the various heating/cooling systems in the building that rely on water (or other liquid median) to transfer energy are connected at various points along a header that is filled with water (or other suitable liquid medium). The header is suitably an elongate pipe, with the temperature of the water in the pipe being in a continuous thermal gradient from hot at one end to cold at the other. Therefore, at one end of the header the water will be hottest, then moving towards the other end it will progressively cooler, from warm to cool then coldest. The exemplary systems described herein below utilize water as the fluid forming the thermal medium, but it will be understood that other suitable fluids may be used in some embodiments. Furthermore, it will be understood that the term "water", as used in this description and the appended claims, includes not just pure and substantially pure water, but also water including various additives, dissolved materials, impurities, and other substances.

Each system is connected to the header with an intake located on the header at a point where, based on the gradient, the temperature will be closest to the ideal for operation of that system, from an energy efficiency standpoint. The discharge, in turn, is connected to the header at a point where, again based on the gradient, the temperature of the water therein will most closely match the optimal-temperature discharge from the system. For example, if one system optimally requires warm water for intake and discharges it at a cool temperature, then its intake will be positioned at a point along the header at which, due to the gradient, the water contained therein is normally warm, and the discharge will be connected at a different point where the water in the header is normally cool. If another system, in turn, optimally requires cool water for intake and discharges it warm, its intake connection will be located at a cool segment of the header and the discharge connection will be at a warm segment, which will be proximate the intake connection of the first system. The first system which will therefore pick up the water discharged from the second, which is now at near optimal temperature for the first system, and then discharge it back into the cool zone of the header as described above.

Consequently, use of the thermal gradient header achieves very significant energy savings by matching the water output temperatures of some systems to the preferred intake temperatures of others. For example, a system that optimally operates with a warm intake flow and discharges it hot need not expend energy first heating the water from cold to warm, as is the case with some prior installations; furthermore, the hot water passing out of the system does not constitute "waste heat" (which some prior systems attempt to recover, albeit with losses), since it is simply discharged back into the header where it is already at a temperature and location optimal for use by some other system. The same holds true for systems that draw water at a warmer temperature and then discharge it at a cooler temperature. The various systems thus cooperate in meeting the heating and cooling requirements of the building or other facility, with (as will be described below) make up heat being added to the header or excess heat rejected only at times of extremes cold or heat (e.g., winter or summer) when the building requirements cannot be met by the operation of the systems themselves.

Figure 2:
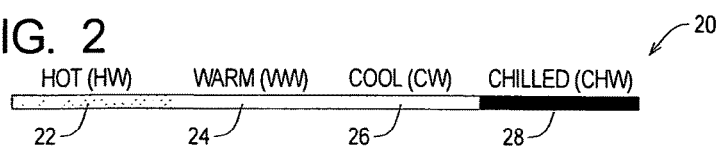
FIG. 2 is a diagrammatic view of a thermal gradient header in accordance with the present invention, with four principal zones of temperature being identified along the length of the header, namely, hot water (HW), warm water (WW), cool water (CW) and chilled water (CHW)

An example header 20 is shown diagrammatically at FIG. 2. In this instance, the header is shown as being divided into four zones, namely, hot water (HW) 22, warm water (WW) 24, cool water (CW) 26 and chilled water (CHW) 28. As will be described in greater detail below, these segments correspond to each of four legs of the header that are routed through the interior of the building; depending on installation, there may be fewer or more legs and corresponding zones in the header, depending on the manner and number of times the header is routed through the building or other facility. The foregoing designations (i.e., HW, WW, CW, CHW) express the relative temperatures of the water contained in each of the legs, however, it will be understood that the temperature within the header will generally follow something of a continuum from hot to cold, rather than being divided into sharply defined zones. It will also be understood that the header, which is suitably an elongate pipe with associated connections and valves, in most embodiments does not itself include any pumps or means for forcing flow of water from one end to the next, with such flow as exists therein generally being created by the pumps of the various systems as they draw and discharge water to and from the header.

Figure 3:
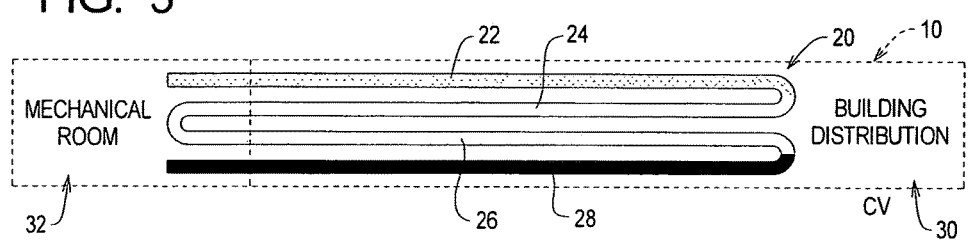
FIG. 3 is a diagrammatic view of an elongate thermal header, similar to that of FIG. 2, installed in an exemplary building, the header being routed circuitously between the mechanical room and building distribution so that each of the four principal temperature zones identified in FIG. 2 is available to be accessed by system connections in both areas.

As can be seen in FIG. 3, the header is suitably routed through the interior of the building 10 in a circuitous manner, back and forth between the building distribution 30 and the mechanical room 32, so that each of the four legs and associated temperature zones ((HW) 22, (WW) 24, (CW) 26, (CHW) 28) is accessible in each area. This makes it possible for each heating/cooling system, regardless of whether it is located in the mechanical room or distribution area, to be connected to points along the header at which the intake and discharge temperatures are optimal, as described above.

Figure 4:
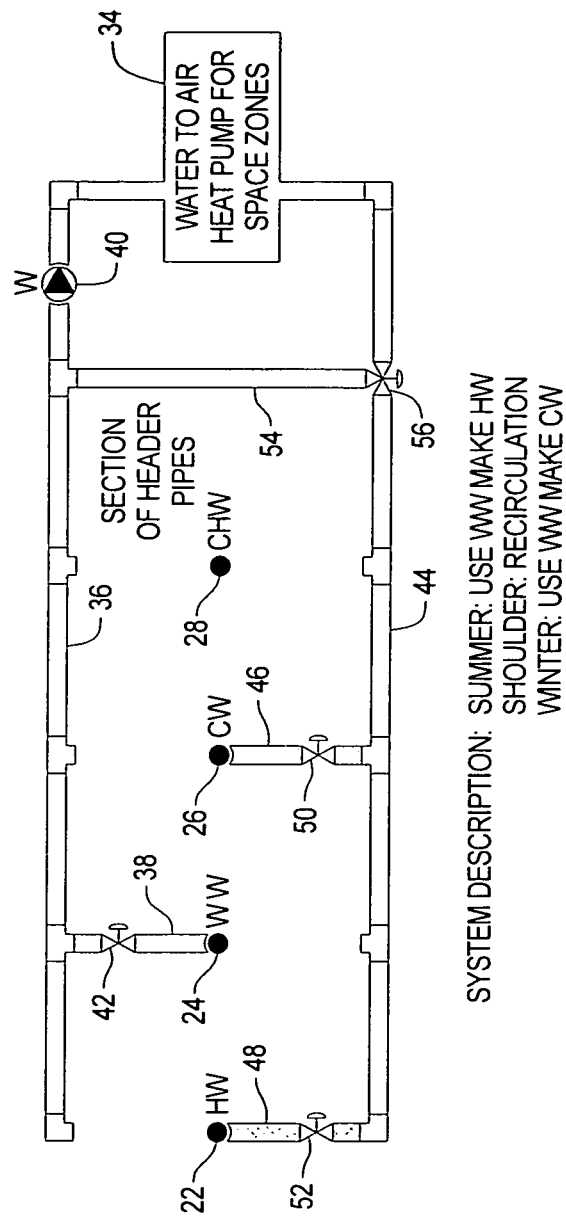
FIG. 4 is a diagrammatic view of exemplary connections of a water-to-air zone heat pump to the thermal gradient header of FIG. 3, the legs of the header forming the four temperature zones being shown in cross-section, the zone heat pump being provided with connections to the hot, warm and cool water sections of the header, to draw from and discharge thereto depending on the mode of operation of the heat pump.

For example, FIG. 4 shows the connections of a water-to-air heat pump 34, which could be located in either the building distribution area or the mechanical room. As is well known, a heat pump is normally able to perform both heating and cooling functions, typically operating in the former mode during winter and the latter mode during summer. In both modes, the heat pump optimally intakes warm water, which when in the heating mode it discharges at a slightly lower temperature as cool water, and when in the cooling mode it discharges at a slightly higher temperature as hot water, heat having been either extracted from or added to the water as a part of the operating cycle of the heat pump.

Thus, in accordance with the present invention, the zone heat pump 34 is installed with an intake line 36 that is connected to the warm water leg 24 of the elongate thermal gradient header in this case, within the building distribution area 30 (see FIG. 3), by a connector line 38. Water is drawn from the warm water connection by a constant velocity pump 40, with intake being controlled by valve 42. The discharge line 44, in turn, is connected to both the cool water and hot water legs 26, 22 of the header, via connector lines 46, 48, with flow to each being controlled by valves 50, 52. No connection is made to the chilled water leg 28 in this case, since it is not needed to support either mode of operation (heating or cooling) of the zone heat pump.

Thus, when the zone heat pump 34 is in the heating mode, warm water is drawn from header segment 24, via lines 38 and 36, and then discharged back to the cool water leg 26 of the header via lines 44 and 46; when the heat pump is in the cooling mode, in turn, warm water is again drawn from segment 24, again via line 38 and 36, but the output is instead discharged to the hot water leg 22 of the header, via lines 44 and 48. Valves 50, 52 are opened/closed selectively to direct the discharge flow to the appropriate segment of the header depending on operation of the heat pump. In addition, a crossover line 54 between the intake and discharge lines, on the pump side of the header connections, permits water to be circulated through the heat pump during "shoulder" seasons when significant heating/cooling is not required; for recirculation, a three-way valve 46 is actuated to divert the discharge from the pump 40 to the crossover line, preventing the discharge from flowing back to the header, while the intake valve 42 can likewise be closed to prevent the pump from drawing from the header.

Figure 5:
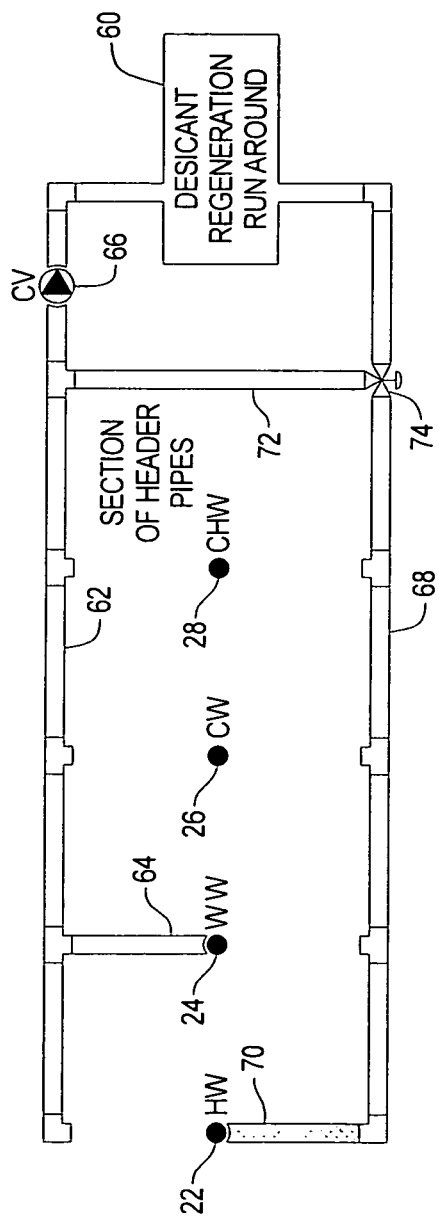
FIG. 5 is a diagrammatic view, similar to FIG. 4, showing the connections of a dehumidification heating source to the hot and warm legs of the header.

FIG. 5, in turn, shows the connections for a dehumidification heating source. The desiccant regeneration runaround 60 optimally intakes warm water, which then picks up excess regeneration heat so that the water is discharged at a higher temperature, i.e., as hot water. Therefore, as can be seen in FIG. 5, the intake line 62 is connected to the warm water leg 24 of the header, via an intake connection line 64, with water being drawn from the warm water leg 24 by a constant velocity pump 66. The hot water from the unit exits through a discharge line 68, and through connector line 70 to the hot water leg 22 of the header. No connections are made to the cool water or chilled water legs 26, 28, since supply from these legs is not needed to support operation of the system. Similar to the installation in FIG. 4, a crossover line 72 is mounted between the intake and discharge lines 62, 68 to permit recirculation of the water without drawing from/discharging to the header, flow through the crossover line being controlled by a three-way valve 74.

Figure 6:
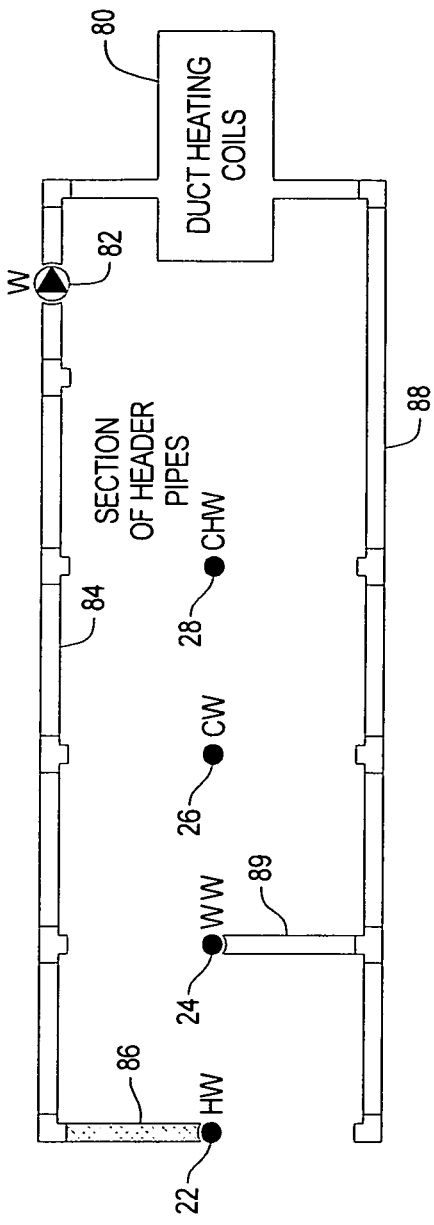
FIG. 6 is a diagrammatic view, similar to FIG. 4, showing the connections of duct-mounted heat coils to the hot and warm legs of the header.

It will be noted that both the zone heat pump of FIG. 4 and the dehumidification heating source of FIG. 5 intake water from the warm water leg 24 of the header. FIG. 6, in turn, shows the installation of a system that discharges to the warm water leg rather than drawing from it, specifically, a duct-mounted heating coil system 80. As can be seen, the duct-mounted heating coil system is supplied with water from the hot water leg 22 of the header, by a variable volume pump 82 drawing through the intake line 84 and connector line 86. The duct heating coils heat the interior of the building, using transfer air received from common areas, after which the water exits the coils at a reduced temperature and is discharged via lines 88 and 89 to the warm water leg of the header. At or near the point of discharge on the warm water leg 24, another system that requires warm water draws water back out of the header, such as the zone heat pump of FIG. 4 or dehumidification heating source of FIG. 5; since the warm water is already at or close to the optimal intake temperature of the second system the efficiency of the latter is maximized, and there is essentially no "waste heat" to the warm water that is discharged from the first system.

Figure 7:
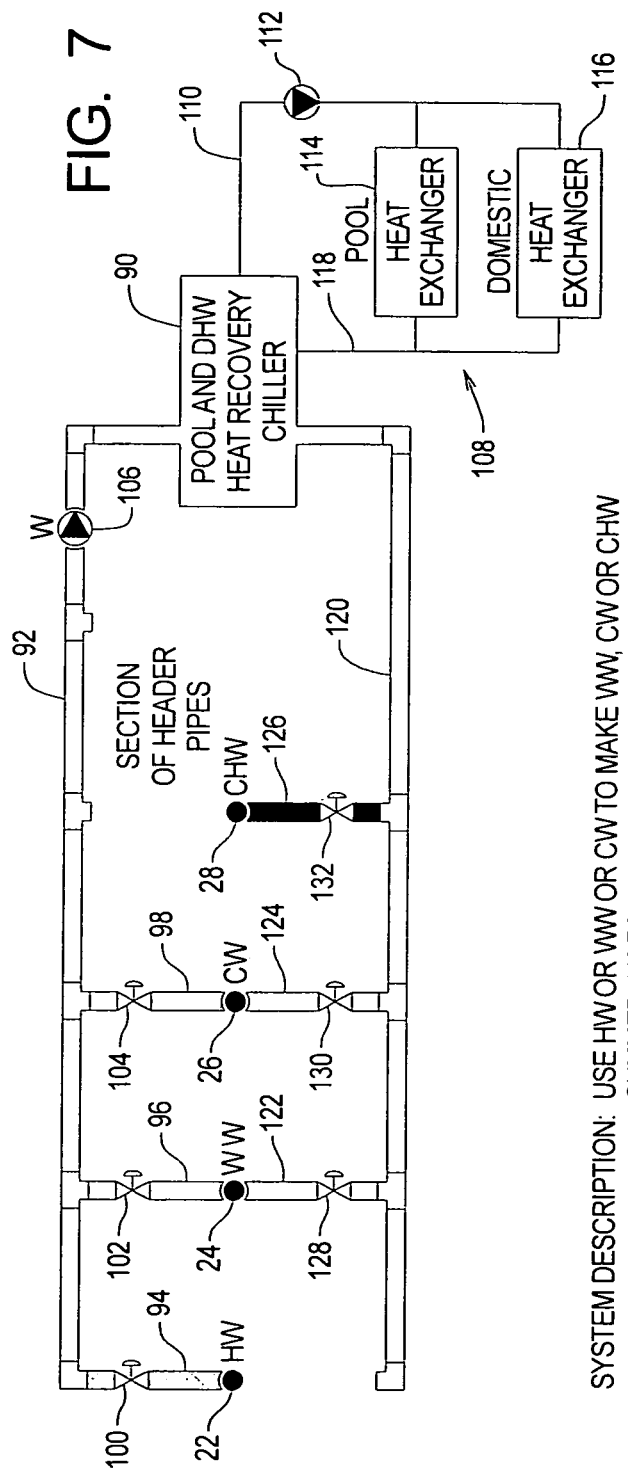
FIG. 7 is a diagrammatic view, similar to FIG. 4, showing the connections of a domestic hot water heating system into the warm and cool legs of the header.

FIG. 7, in turn, shows the installation of a system that utilizes excess heat from the building or other facility (e.g., excess heat generated during warm summer months) to heat water for a pool and also domestic purposes. As can be seen, a heat recovery chiller 90 is connected via an intake line 82 to each of the hot water, warm water and cool water legs 32, 34, 36 of the header, via respective connector lines 94, 96, 98 and control valves 100, 102, 104. Water from any or all of these legs is drawn through the intake line by a variable-volume pump 106 and supplied to the heat recovery chiller 90, wherein heat is exchanged with water in a secondary loop 108. As can be seen, the secondary loop includes an intake line 110 from which water is drawn from the heat recovery chiller 90 at an elevated temperature by pump 112, and is then supplied to heat exchangers 114, 116 for heating water for the pool and for domestic use, respectively. The water then flows back to the heat recovery chiller at a lower temperature, via the return line 118 of the secondary loop 108. The heat recovery chiller thus passes excess heat from the main header 30 to the pool and domestic hot water supply. Water in the primary loop exits the heat recovery chiller 80 through discharge line 120 and returns to either or all of the warm water, cool water or chilled water legs 34, 36, 38 of the header, via connector lines 122, 124, 126 and control valves 128, 130, 132.

The intake control valves enable the heat recovery chiller to draw on any or all of the relatively "warm" legs on the header, depending on how much and from which zones the heat is to be extracted, while the return control valves similarly enable the return flow to be directed to the zone or zones matching the output temperature; during summer when there is a need for chilled water, which is drawn from the header by the various cooling system of the building/facility, the pool and domestic hot water heat recovery chiller is preferably used to make chilled water that is discharged to leg 28 of the header, with the valves preferably being set up to draw from one of the two cooler of the "warm" legs 44, 46 such that (given the temperature differential across the heat recovery chiller 90) the return water will be at a suitably low temperature for discharge to the chilled water leg of the header. During periods when the building or other facility is not producing excess heat, such as during winter for example, the pool and domestic heat recovery chiller system will normally not be used, since there will generally not be excess heat to be removed from the thermal gradient header 30.

FIGS. 8-14 show the connections of various additional systems to the thermal gradient header, each of which will be described below. In each case, the system intake picks up water from one or more points on the header where the temperature is optimally matched to the requirements of the system and discharges water to points that most closely match the optimal output temperature of the system, from which another system then picks up the water at a now optimal intake temperature for the latter's operation; this preferably continues for all the relevant systems within the building or other facility, thus compounding the efficiency benefits described above. Furthermore, FIGS. 8-14 (as well as FIGS. 4-7) illustrate diagrammatically the ease with which system-to-header connections can be designed and installed throughout the building or other facility, given the preferred "back-and-forth" routing that defines the different temperature legs of the header.

Figure 8:
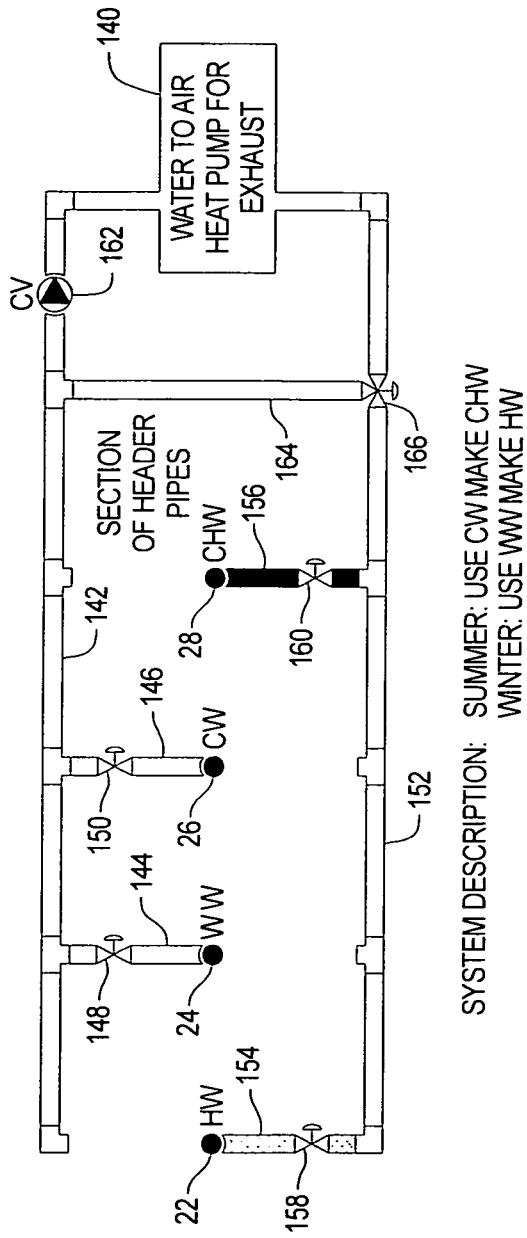
FIG. 8 is a diagrammatic view, similar to FIG. 4, showing the connections of an exhaust heat pump to the hot, warm, cold and chilled legs of the header.

FIG. 8 shows the installation of a water-to-air exhaust heat pump 140 having an intake line 142 that is connected to both the warm water and cool water legs 24, 26 of the header, by connector lines 144, 146 and control valves 148, 150. The discharge line 152, in turn, is connected to the hot water and chilled water legs 22, 28, via connector lines 154, 156 and control valves 158, 160. Water is drawn from the intake line 142 by a constant velocity pump 162, from which it is circulated through the exhaust heat pump back to the discharge line 152. During summertime and other periods of warm ambient temperatures, the intake water is drawn from the cool water leg 26 of the header and discharged at a cooler temperature back to the chilled water leg 28; during this mode of operation, control valves 150 and 160 are open, while valves 148 and 158 are closed. Then, during winter and other periods of cold weather, the intake water is drawn from the warm water leg 24 of the header and discharged at a higher temperature back to the hot water leg 22, with the arrangement of the control valves being reversed. A crossover line 164 is installed between the intake and discharge lines 142, 152 for recirculation of water through the exhaust heat pump when desired (e.g., during "shoulder" seasonal periods), with flow through the crossover recirculation line being controlled by a three-way valve 166.

Figure 9:
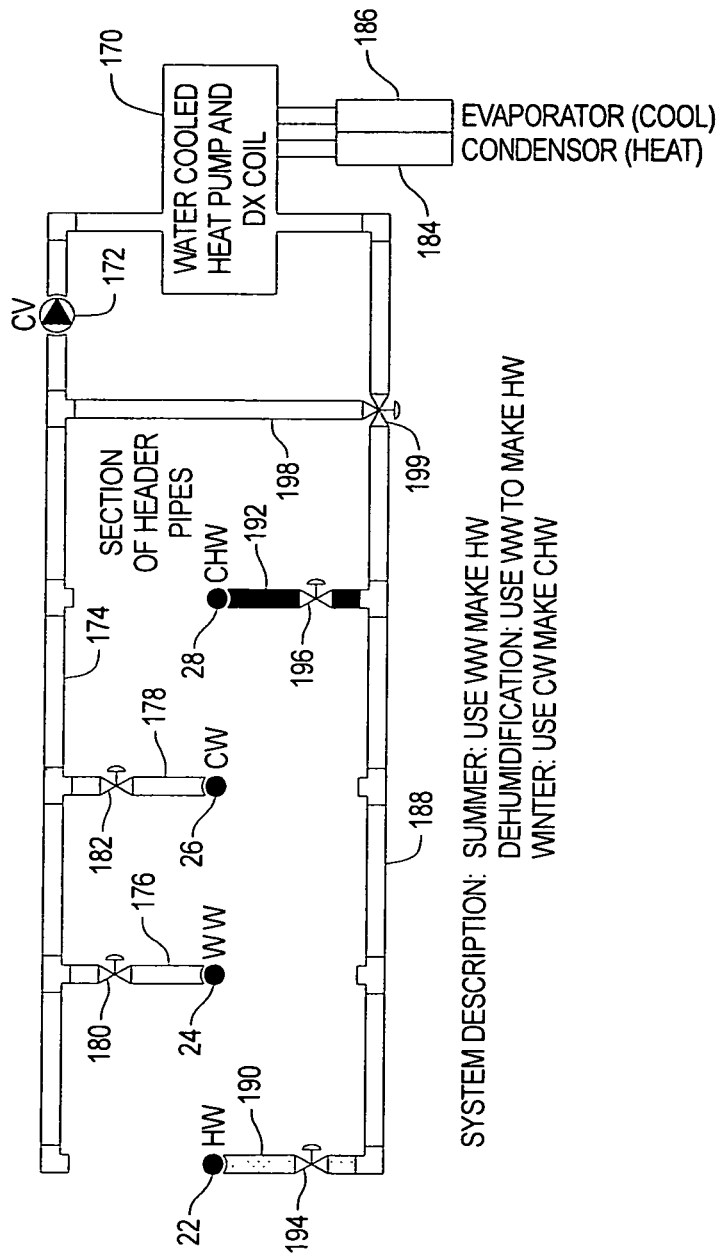
FIG. 9 is a diagrammatic view, similar to FIG. 4, showing the connections of a water-cooled heat pump to the hot, warm, cool and chilled legs of the header.

FIG. 9 shows the connections of a water cooled heat pump and DX coil 170. As can be seen, water is supplied to the heat pump system by a constant velocity pump 172, which draws from an intake line 174 that is connected to the warm water and cool water legs 24, 26 of the header by connector lines 176, 178 and control valves 180, 182. The water passes through the heat pump system, which includes a condenser section 184 for heating and an evaporator section 186 for cooling, and then returns to the header via a discharge line 188 that is connected to the hot water and chilled water legs 22, 28 by connector lines 190, 192 and control valves 194, 196. During summer or other periods of high ambient temperature, the water cooled heat pump 170 draws from the warm water leg of the header for cooling purposes, using evaporator section 186, and then returns the water at an elevated temperature to the hot water leg 22; for dehumidification operation, the system similarly draws from the warm water leg of the header and discharges to the hot water leg. Then, during winter or other periods of cool ambient temperatures, the system draws from the cool water leg 26, for utilization by the condenser section 184 for heating purposes, and returns the water at a reduced temperature to the chilled water leg 28. The control valves 180, 182, 194 and 196 are respectively opened/closed for the different modes of operation. Again, a crossover line 198 and three-way valve 199 are provided for recirculation of water without drawing from/discharging to the thermal gradient header, as desired.

Figure 10:
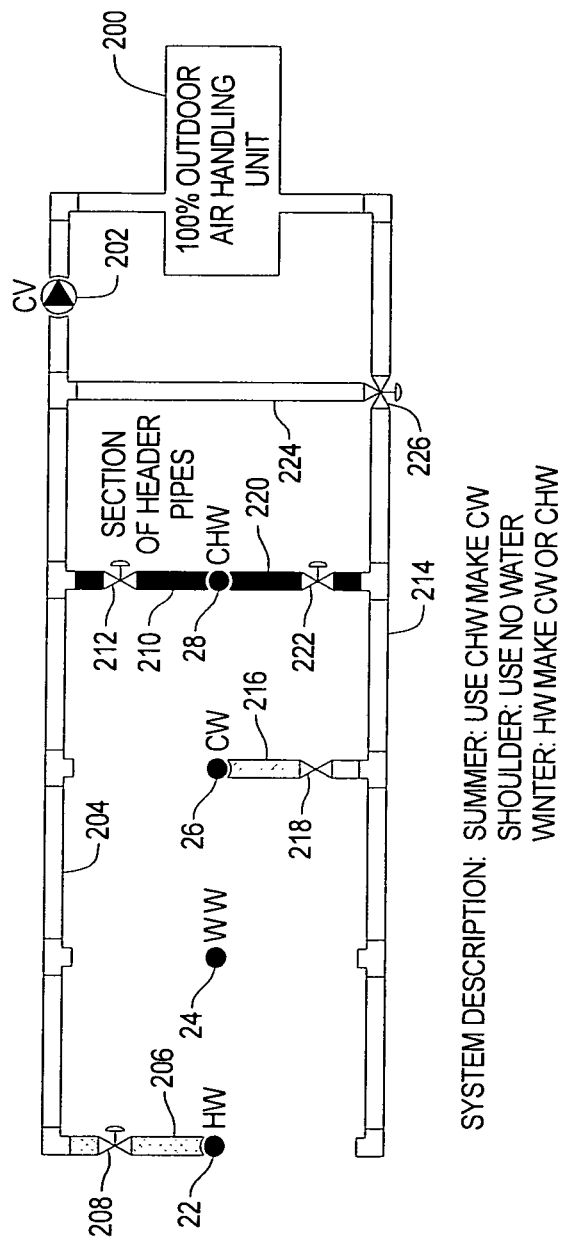
FIG. 10 is a diagrammatic view, similar to FIG. 4, showing the connections of a makeup air unit to the hot, cool and chilled legs of the header.

FIG. 10 shows the connections of an outdoor air handling unit that provides makeup air to the living areas of the building or other facility. As can be seen, a constant velocity pump 202 supplies the air handling unit with water drawn through intake line 204, which is connected to the hot water leg 22 of the thermal gradient header by connector line 206 and control valve 208, and to the chilled water leg 28 by connector line 210 and control valve 212. The discharge line 214, in turn, is connected to the cool water leg 26 of the header by connector line 216 and control valve 218, and to the chilled water leg 28 by connector line 220 and control valve 222. During summer or other times of high ambient temperatures, chilled water is drawn from leg 28 of the thermal radiant header, via line 210 and valve 212, and after being utilized to cool the incoming warm air is discharged to the cool water leg 26 of the header through valve 218 and connector line 216. During winter and other cold periods, in turn, hot water is drawn from leg 22 of the header via connector line 206 and valve 208, and after being utilized to warm the cold incoming air is discharged back to either the cool water leg 265 or chilled water leg 28 of the header, via the respective valves and connector lines. A crossover line 224 between the intake and discharge lines 204 and a three-way valve 226 allow the air handling unit to recirculate water without drawing from/discharging to the header, during shoulder seasons and other times when heating cooling of the outdoor air is not desired.

Figure 11:
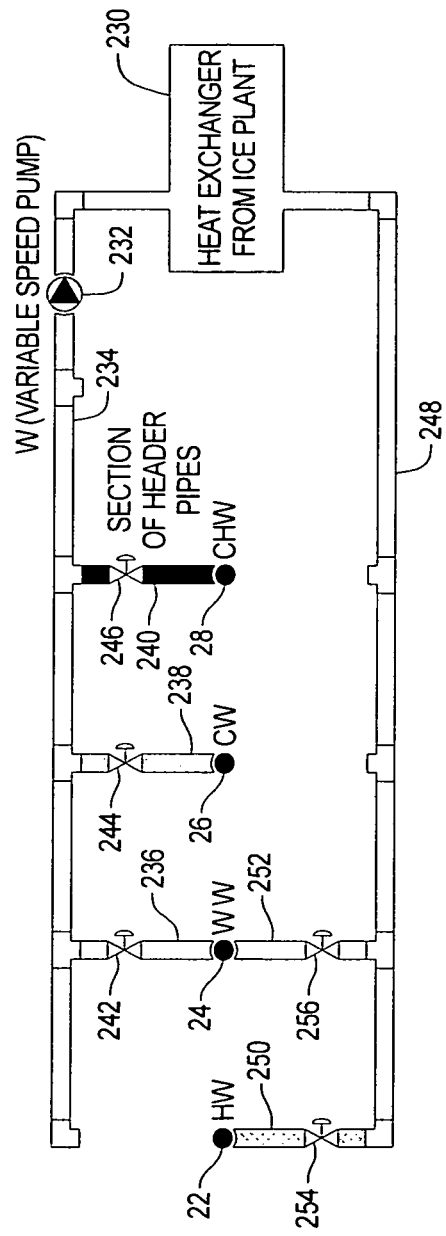
FIG. 11 is a diagrammatic view, similar to FIG. 4, showing the connections of an ice plant heat exchanger to the hot, warm, cool and chilled legs of the header.

FIG. 11 shows the connections of an ice plant heat exchanger, such as may be used with an ice plant for an ice rink, for example. Water is supplied to the ice plant heat exchanger 230 by a variable speed pump 232 drawing through an intake line 234 that is connected to the warm water/cool water and chilled water legs 24, 26, 28 of the thermal gradient header, by connector lines 236, 238, 240 and control valves 242, 244, 246. Water exits the ice plant heat exchanger through a discharge line 248 that is connected to the hot water and warm water legs 22, 24 of the header by connector lines 250, 252 and control valves 254, 256. The heat exchanger essentially picks up what would otherwise have been waste heat from the ice plant, generated from the refrigeration process necessary to produce the ice, and transfers it into the thermal gradient header for use by the other systems. For example, during summer or other times of high ambient temperatures, the valves may be lined up so that the ice plant heat exchanger will draw from the warm water leg of the header, and then discharge the water at a higher temperature back to the hot water leg 22. Similarly, during winter the system can draw from the chilled water or cool water legs 28 or 26 to make warm water or hot water that is supplied back to legs 24 or 22, and likewise during shoulder seasons the system may draw from the cool water leg 26 to make warm water or hot water supplied to legs 24 or 22. The control valves 224, 244, 246, 254, 256 can be lined up to provide any of the foregoing flow paths.

Figure 12:
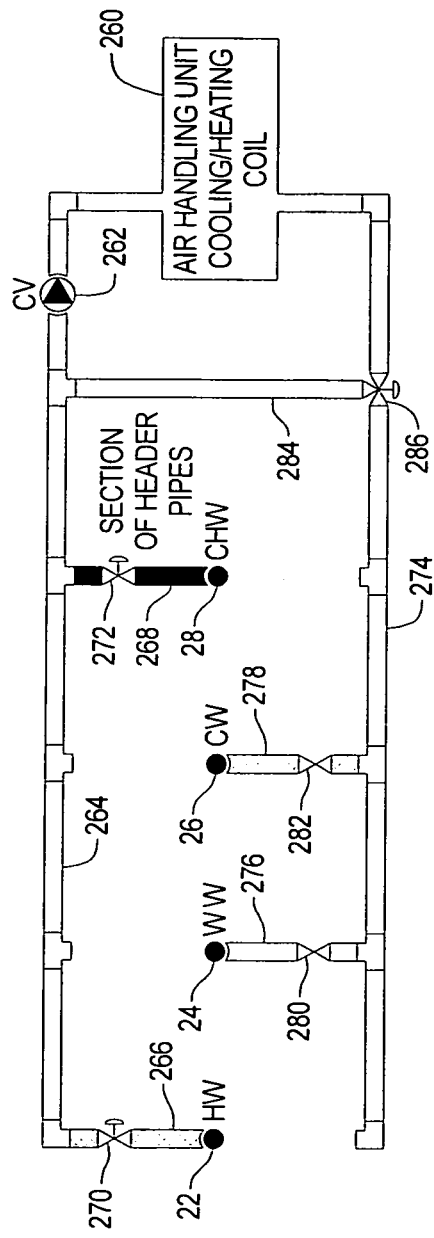
FIG. 12 is a diagrammatic view, similar to FIG. 4, showing the connections of an ice rink air handling unit to the hot, warm, cool and chilled legs of the header.

FIG. 12 shows the connections of an air handling unit that is associated with an ice rink that may be installed in conjunction with the ice plant of FIG. 11. As can be seen, water is supplied to the air handling unit by a constant velocity pump 262, drawing on an intake line 264 that is connected to the hot water and chilled water legs 22, 28 of the thermal gradient header, by connector lines 266, 268 and control valves 270, 272. Water exits the air handling unit through discharge line 274, which is connected to the warm water and cool water legs 24, 26 of the header by connector lines 276, 278 and control valves 280, 282. A crossover line 284 interconnects the intake and discharge lines 264, 274, with flow therethrough being controlled by valve 286. During winter and other periods of cold weather, water is drawn from the hot water leg 22 and utilized to heat the cold air that is passing through the air handling unit, with the outflow water being directed to either the warm water leg 24 or cool water leg 26 depending on its temperature. However, during summer and other warm period, the air handling unit is generally used for ventilation only, with water circulating through the crossover line 284 rather than being drawn from/discharged to the thermal gradient header. The air handling unit can also be used for dehumidification purposes, with cold water being utilized to dehumidify the air passing through the unit; during dehumidification, chilled water is drawn from leg 28 of the thermal gradient header and is returned at a higher temperature to the cool water leg 26.

For many installations, it will be preferable to design and install the various heating/cooling systems to operate at or near the low end of their designed circulation rate ranges (i.e., near the low end of their permitted circulation rates): This achieves the dual advantages of maximizing the thermal differential ($\gamma T$) across each system, thereby typically increasing efficiency while providing an output temperature closer to that optimal for other systems (e.g., putting the output from an air conditioning system closer to the optimal intake temperature of a water heating systems), while reducing losses in terms of fluid transportation/pumping energy. Lower pumping rates also tend to increase efficiency by reducing the amount of flow that takes place within the thermal gradient header itself.

Figure 13:
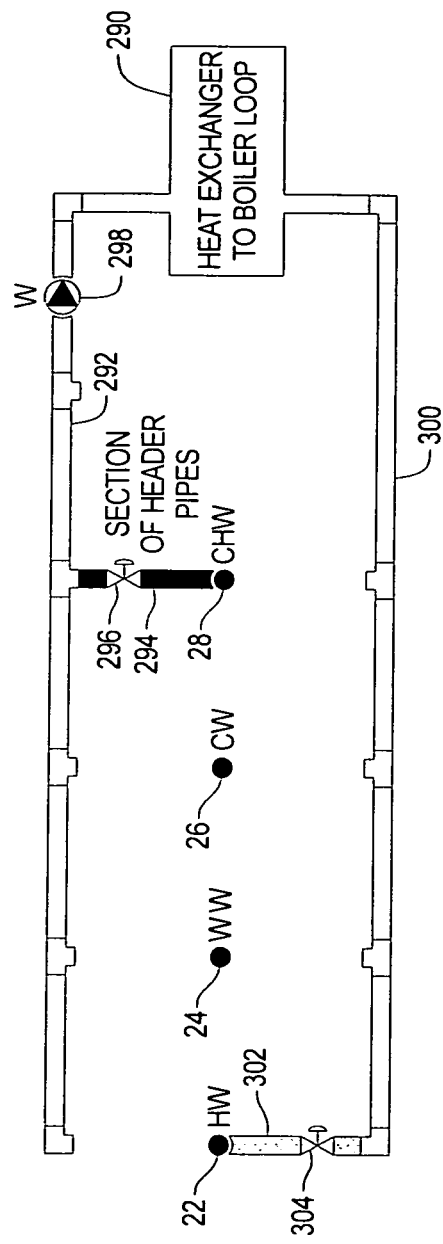
FIG. 13 is a diagrammatic view, similar to FIG. 4, showing the connections of a boiler heat exchanger to the hot and chilled legs of the header.

FIG. 13 shows the connections of a boiler loop hot water heat exchanger 290. The purpose of this system is to be able to feed additional heat into the header at times when the heat demand imposed on the header is beyond that which the building's systems can provide en toto without help from the boiler; such instances are anticipated to be comparatively rare, due to the enhanced efficiencies described above, but may occur, for example, during periods of particularly cold weather. As can be seen, the intake line 292 is connected to the chilled water leg 28 of the header, by connector line 294 and control valve 296, with water being drawn therefrom and supplied to the boiler loop heat exchanger 290 by a variable volume pump 298. The heat exchange also receives hot water from the boiler, such that the water circulating from the header exits at a significantly higher temperature via discharge line 300, which is connected to the hot water leg 22 of the header by connector line 302 and control valve 304. At times when the thermal gradient header does not require additional heat beyond that which is provided by the other systems besides the boiler, the valves 296, 304 and pump 298 are simply secured, along with flow from the boiler to the heat exchanger and possibly the boiler itself; this ability to minimize use of the boiler reflects the efficiency achieved by the present invention, and provides significant cost savings over conventional buildings/facilities that require frequent or even continuous operation of the boiler. It will be understood that other heat sources may be used to provide the make-up heat, in place of or in addition to a boiler, such as a geothermal heat source, for example.

Figure 14:
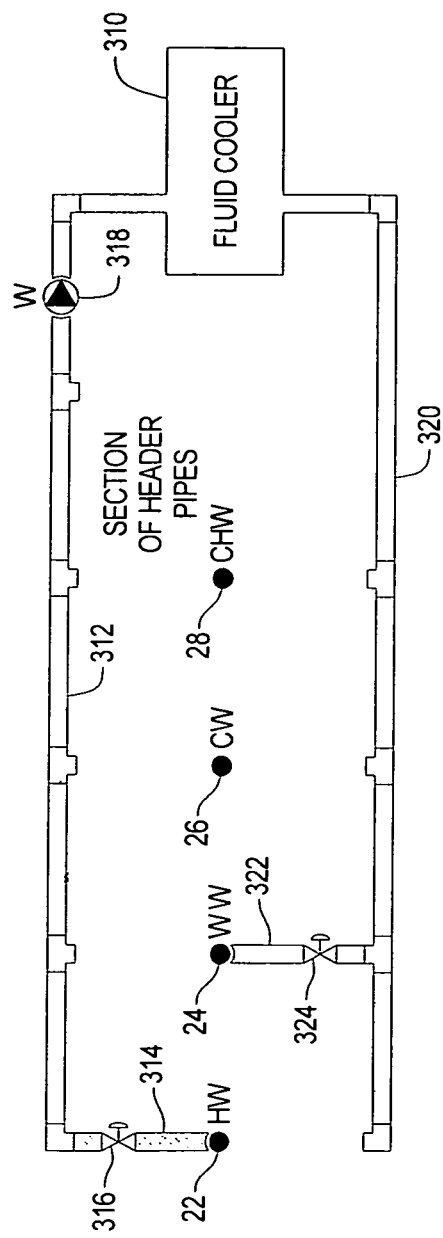
FIG. 14 is a diagrammatic view, similar to FIG. 4, showing the connections of a fluid cooler to the hot and warm legs of the header.

FIG. 14, in turn, shows the connections of a fluid cooler system 310 which serves a converse purpose relative to the boiler heat exchanger of FIG. 13, i.e., to remove excess heat from the thermal gradient header beyond that which can be extracted and used by the other systems; again, this is anticipated to be a comparatively rare situation due to the efficiencies achieved by the thermal gradient header, but may occur, for example, during periods of hot weather when the building/facility produces too much heat. Accordingly, the intake line 312 is connected to the hot water leg 22 of the thermal gradient header, via connector line 314 and control valve 316, with water being drawn therefrom and supplied to the cooler by a variable volume pump 318. After passing through the cooler, the water returns at a lower temperature via discharge line 320, which is connected to the warm water leg 24 of the header by connector line 322 and control valve 324. The excess heat removed by the fluid cooler may simply be passed to the outside air or otherwise rejected, in some instances, however, it may be supplied (e.g., using piped water) to a geothermal reservoir or the like, from which the heat can subsequently be recovered and supplied back to the thermal gradient header at times when additional heat is needed, similar to the manner in which additional heat is provided by the boiler loop heat exchanger of FIG. 13. Storage in a geothermal reservoir, such as a ground source thermal field or "battery" provides very significant advantages over traditional ground-source heating systems, since typically the latter only draw heat from the field until the ground is completely chilled ("frozen") and the field is useless, whereas by adding excess heat from the thermal header when available the life of the ground source field can be extended indefinitely. Moreover, given the thermal input from the header of the present invention, the ground source field can be greatly reduced in size while still providing the same capacity for heating, resulting in significantly reduced installation costs.

Control technology for operating the pumps and valves associated with the various systems that are connected to the legs of the thermal gradient header is well known to those skilled in the relevant art. Furthermore, it will be understood that the various systems and connections that are shown in FIGS. 4-14 are provided by way of illustration rather than limitation and that the connections may vary depending on actual system requirements, and furthermore that various other systems may be connected to the thermal gradient header depending on the type of building or other facility. Still further, it will be understood that the size, capacity routing and so on of the thermal header, and the various connections thereto, will vary with the type of building or facility, the types and numbers of systems, and other design factors.

The block diagrams of 15 and 16 offer a schematic comparison of the thermal losses of a typical prior art system and the thermal gradient header system of the present invention.

Figure 15:
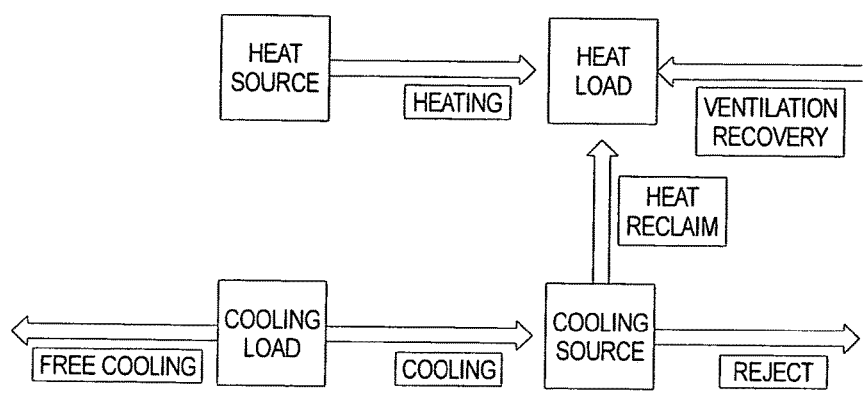
FIG. 15 is a block diagram illustrating a typical prior art approach to achieving thermal efficiency between heating/cooling systems in a facility, showing the discharge of heat through free cooling and heat rejection and the inherent inefficiency resulting therefrom.

As can be seen in FIG. 15, which illustrates a typical prior art installation, cooling and heating systems operate largely impendent of one another: For example, a heat source may provide heating to a heat load, such as a living space, while a cooling source provides cooling (i.e., draws heat from) a cooling load such as an ice rink or for refrigeration. Conventionally, a degree of heat reclaimed from the cooling source may be supplied to the heat load so as to indirectly reduce the load on the heat source. However, when heat reclamation is not required for the heat load, excess heat from the cooling source is simply rejected to the environment, as indicated by the arrow at the lower right. Similarly, excess heat from the cooling load is typically discharged by means of free cooling, e.g., simple ventilation to the outside air. In this example, therefore, both free cooling and rejected heat represent very significant losses of thermal energy.

Figure 16:
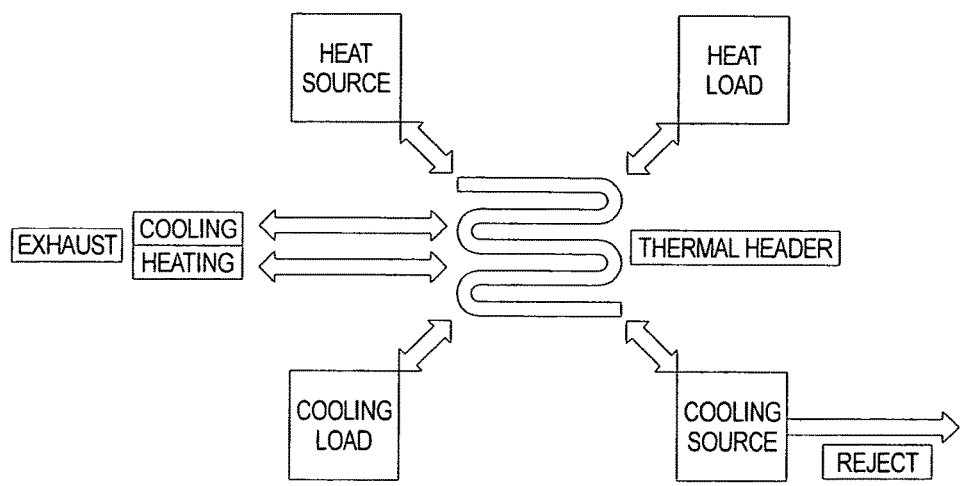
FIG. 16 is a block diagram, similar to FIG. 15, illustrating sharing of loads between heating/cooling systems in a facility utilizing a thermal gradient header in accordance with the present invention, showing the reduced thermal losses and increased efficiencies achieved thereby.
Figure 17:
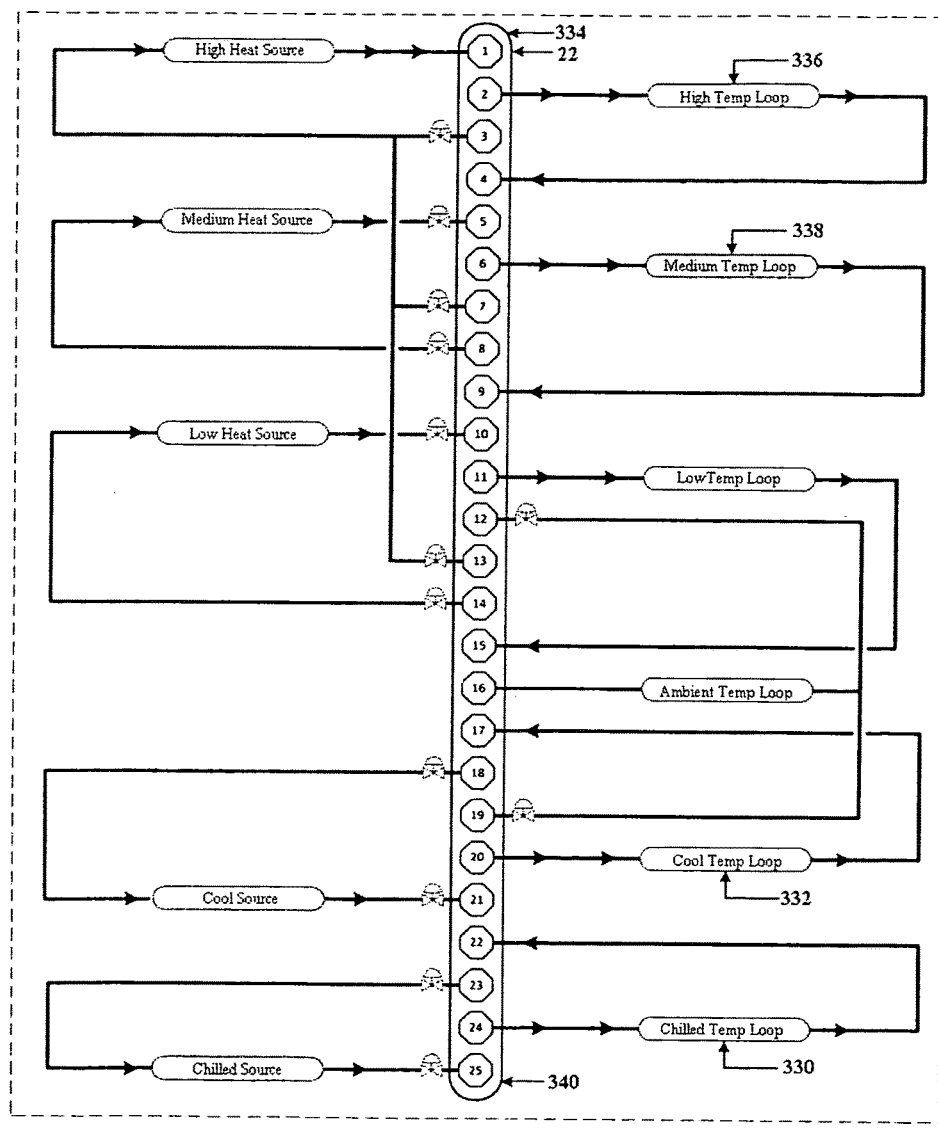
FIG. 17 is a diagrammatic view of a thermal gradient header in accordance with the present invention, installed in a facility such as that in FIG. 1 and having a plurality of heating and cooling systems connected thereto so as to operate in combination to provide heating and cooling to the facility in an energy efficient manner.

By comparison, as shown in FIG. 16 and also FIG. 17, the thermal gradient header is shared by all of the heating and cooling loads in a facility 10, so that a thermal output from one system is taken in and used by another. For example, as is shown and as described above, the heated by cooling loads (e.g., cooling systems 330, 332) is discharged at increased temperatures of outlets disposed towards the warm end 334 o the header 22, where it is take n up by systems that utilize the water at higher temperatures, while the water chilled by heating loads (e.g., heating systems 336, 338) is discharged towards the cool end 340 of the header, where it can be taken up by systems employing the water at lower temperature. As a result, very little thermal energy (in some installations none) needs to be added by a heat source (such as a boiler) connected at one end of the header and/or rejected by a cooling source connected at the other. Moreover, what little heat may need to be rejected can be supplied to a geothermal field or other reservoir for reuse later. Thermal losses are therefore almost nil by comparison with the prior art type of installation shown in FIG. 15.

It is to be recognized that various alterations, modifications, and/or additions may be introduced into the constructions and arrangements of parts described above without departing from the spirit or ambit of the present invention.

What is claimed is:

1. Apparatus for increasing efficiency of heating and cooling systems for buildings and other facilities, said apparatus comprising:

an elongate thermal gradient header having at least one zone containing fluid at a relatively higher temperature and at least one zone containing fluid at a relatively lower temperature; and a plurality of heating/cooling systems that draw said fluid from said thermal gradient header and discharge said fluid back thereto, each of the heating/cooling systems having an intake connected to a first one of the zones of the header that contains said fluid at a temperature closer to an optimal intake temperature of the heating/cooling system, and a discharge connected to a second of said zones that contains said fluid at a temperature that is closer to an optimal discharge temperature of said system.

2. The apparatus of claim 1, wherein said plurality of heating/cooling systems comprises:

multiple heat/cooling systems that operate in combination in a facility, that are connected to said thermal gradient header such that at least one of said systems draws from a zone of said header fluid that has been discharged to said zone by at least one other of said heating/cooling systems.

3. The apparatus of claim 2, wherein said thermal gradient header comprises:

an elongate pipe containing said fluid.

4. The apparatus of claim 3, wherein said fluid contained in said elongate pipe is water.

5. The apparatus of claim 3, wherein said zones of said header comprise:

temperature zones formed by legs of said elongate pipe that are routed through said facility.

6. The apparatus of claim 5, wherein said heating/cooling systems connected to said thermal gradient header comprise:

heating/cooling systems connected to said legs and said pipe that are routed through said facility.

7. The apparatus of claim 6, wherein said heating/cooling systems are selected from the group consisting of:

heat pumps;
air handling units;
air conditioning units;
refrigeration units;
water heaters;
ice plants;
and combinations thereof.

8. The apparatus of claim 3, further comprising:

means connected to said thermal gradient header for providing makeup heat as necessary.

9. The apparatus of claim 8, wherein said means for providing makeup heat comprises:

a boiler heat exchanger.

10. The apparatus of claim 3, further comprising:

means connected to said thermal gradient header for rejecting excess heat as necessary.

11. The apparatus of claim 10, wherein said means for rejecting excess heat comprises:

a fluid cooler.

12. The apparatus of claim 10, wherein said means for rejecting excess heat comprises:

a thermal reservoir from which heat may be recovered during a subsequent period of operation.

13. The apparatus of claim 12, wherein said thermal reservoir comprises:

a ground source thermal field.

14. The apparatus of claim 3, wherein said thermal gradient header comprises:

multiple legs, each leg containing fluid at progressively cooler temperatures from hot to cold.

15. The apparatus of claim 14, wherein said multiple legs of said thermal gradient header comprise, progressively:

a hot water leg;
a warm water leg;
a cool weather leg; and
a chilled water leg.

16. The apparatus of claim 15, wherein said legs of said thermal gradient header comprises:

legs defined by runs of said pipe routed with said facility.

17. The apparatus of claim 16, wherein said rungs of said pipe are routed back and forth between a mechanical room and distribution areas of said facility.

18. The apparatus of claim 15, further comprising:

a plurality of pumps associated with said heating/cooling systems, that each circulate said fluid from a first leg of said header, through said associated system, and back to a second leg of said header.

19. The apparatus of claim 18, further comprising:

a plurality of intake and discharge lines connecting said heating/cooling systems to said header, through which said fluid is circulated by said pumps.

20. The apparatus of claim 19, further comprising:

one or more crossover lines that interconnect said intake and discharge lines, so that said fluid can be selectively circulated through said heating/cooling systems without being drawn from/discharged to said thermal gradient header.

21. The apparatus of claim 19, further comprising:

one or more control valves that are selectively operable to allow said pumps associated with said heating/cooling systems to draw from/discharge to different legs of said thermal gradient header depending on operating conditions of said heating/cooling systems.

22. A method for increasing efficiency of heating and cooling systems for buildings and other facilities, said method comprising the steps of:

providing an elongate thermal gradient header having at least one zone containing a fluid at a relatively higher temperature and at least one zone containing said fluid at a relatively lower temperature; and supplying said fluid from the thermal gradient header to a plurality of heating/cooling systems, the step of supplying said fluid from the thermal gradient header to said plurality of heating/cooling systems comprising drawing said fluid from said thermal gradient header for each heating/cooling system from a first one of the zones that contains said fluid at a temperature closer to an optimal intake temperature of that system, and then discharging said fluid from the system to a second of the zones of the header that contains the fluid at a temperature that is closer to an optimal discharge temperature of that system.

23. The method of claim 22, wherein the step of discharging said fluid back to said second zone of said thermal gradient header comprises:

discharging said fluid back at a lower temperature/higher temperature than that at which said fluid is drawn from said first zone of said header.

24. The method of claim 23, wherein the step of supplying fluid from said thermal gradient header to a plurality of heating/cooling systems comprises:

supplying said fluid to multiple/heating systems that operate in combination in a facility, said heating/cooling systems being connected to said thermal gradient header so that certain of said systems draw from zones of said header fluid that has been discharged to said zones at near optimal intake temperatures by others of said heating/cooling systems.

25. The method of claim 24, wherein the step of providing a thermal gradient header comprises:
providing an elongate pipe that contains said fluid.

26. The method of claim 25, wherein said fluid is water.

27. The method of claim 25, wherein the step of providing said thermal gradient header further comprises:
routing said elongate pipe in said facility so as to form multiple legs of said header that define said temperature zones thereof, said temperature zones containing said fluid at progressively cooler temperatures from hot to cold.

28. The method of claim 27, wherein the step of providing fluid from said thermal gradient header to said plurality of heating/cooling systems comprises:
drawing fluid from supply legs of said header using pumps that are associated with said heating/cooling systems;
circulating said fluid through said heating/cooling systems; and
discharging said fluid from said heating/cooling systems back to receiving legs of said header.

29. The method of claim 28, wherein the step of supplying said fluid to a plurality of heating/cooling systems further comprises the step of:
selectively operating one or more control valves so as to allow said heating/cooling systems to draw from/discharge to different legs of said thermal gradient header, depending on operating conditions of said heating/cooling systems.

\* \* \* \* \*